Figure 1:
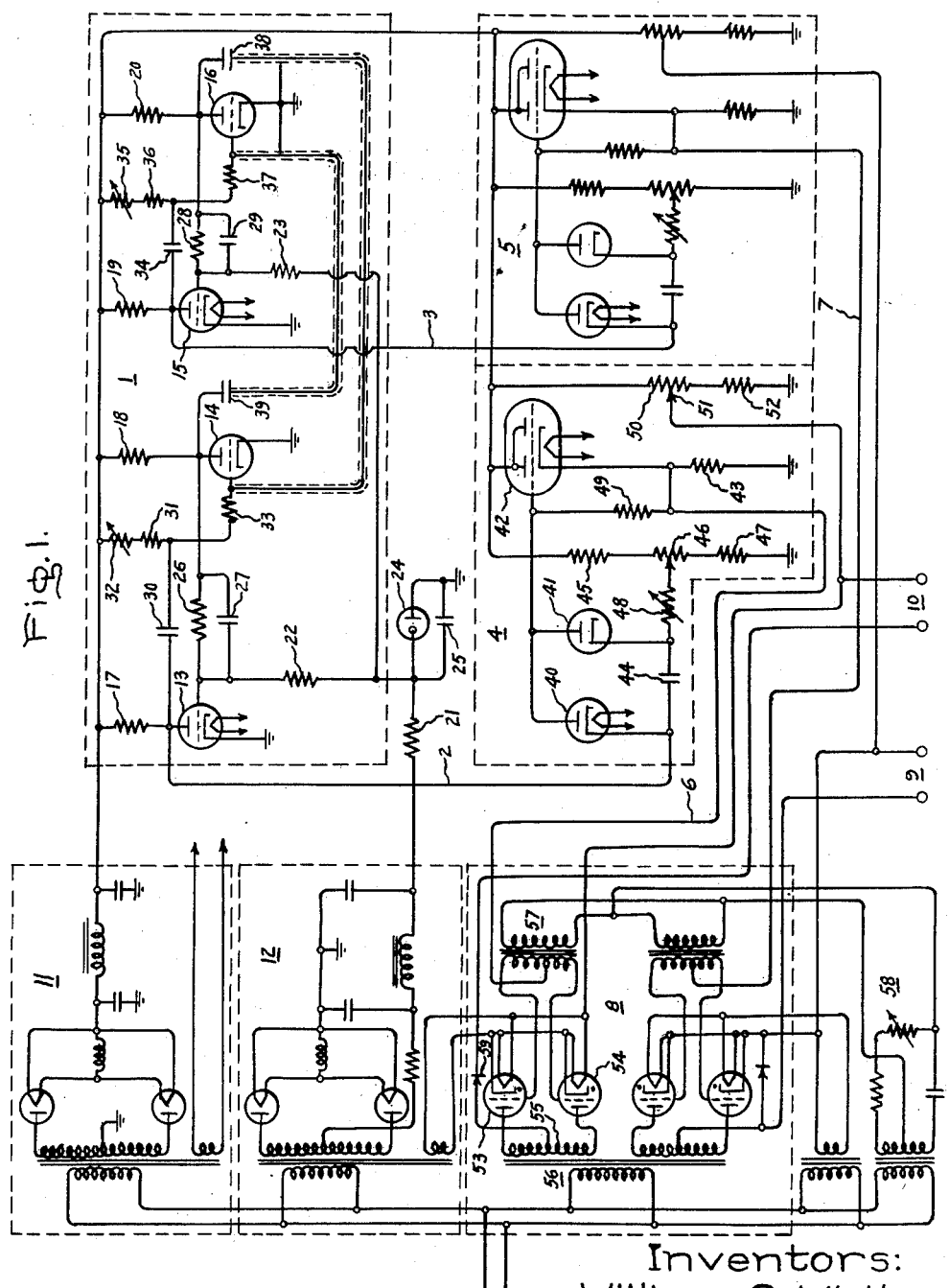

Nov. 24, 1953   W. C. WHITE ET AL   2,660,671
DEVICE FOR PRODUCING RECIPROCATING OR LATERAL MOTION
Filed Sept. 22, 1950   2 Sheets-Sheet 2

Inventors:
William C. White,
Harold W. Lord,
by Paul A. Frank
Their Attorney.

Patented Nov. 24, 1953

2,660,671

UNITED STATES PATENT OFFICE 2,660,671

DEVICE FOR PRODUCING RECIPROCATING OR LATERAL MOTION

William C. White and Harold W. Lord, Schenectady, N. Y., assignors to General Electric Company, a corporation of New York Application September 22, 1950, Serial No. 186,242

3 Claims. (Cl. 250—27)

This invention is an electronic device for producing reciprocating motion and which hereinafter is called a reciprocator.

The low cost and availability of fractional horsepower motors has usually made it convenient to employ reduction gears and a crank mechanism when a reciprocating motion is desired. In many cases, this is an entirely satisfactory arrangement, but there are applications where it lacks flexibility. For example, if the speed of the forward and backward motion must be independently varied through a very wide range and the distance-time relationship during the stroke is to be controlled, complicated mechanical devices are usually required. Allowance for a period of rest of controllable length at the end of each stroke also entails the use of complicated mechanical devices.

An object of our invention is to provide a device for simply producing lateral motion in a hermetically sealed container.

Another object of our invention is to provide a device for producing reciprocating motion in which the distance-time relationship during the stroke may be controlled with facility.

A further object of our invention is to provide a device for producing variable reciprocating motion directly.

A still further object of our invention is to provide a device for producing reciprocating motion in which the length of the stroke, the speed, and the periodicity are easily controlled.

In the attainment of the foregoing objects, we provide one or more solenoids for transforming current into reciprocating motion of an iron core located within the magnetic field of the coils. As direct current is passed through one of the solenoids, an iron core located therein is drawn into the solenoid such that the reluctance between the ends of the coil is a minimum. The shape of the current wave supplied to the solenoids determines the motion of the core as it is drawn into the solenoid. In a simplified reciprocator embodying this invention, one solenoid may be used to pull an iron core against the force of a spring such that when the current in the solenoid is decreased or entirely removed, the expanded spring compresses and draws the core out of the solenoid. Reciprocating motion is thereby produced; however, the motion may be controlled in but one direction. Another method of producing reciprocal motion is to provide a pair of solenoids, each of which acts on separate ferro-magnetic cores which are joined by a nonmagnetic member. The solenoids are arranged end-to-end so that they control the motion of the cores in opposite directions. Consequently, by separately controlling the currents in each solenoid, the entire motion of the reciprocating arm may be controlled in both the forward and backward swings.

In a preferred embodiment of our invention in which the motion of a reciprocating arm is controlled in both the forward and backward swings, there is provided a pair of solenoids arranged end-to-end which act on a pair of ferro-magnetic cores. The current in each solenoid is separately controlled by means of individual wave shaping circuits. A ring-type multivibrator produces square wave outputs which are fed to wave shaping circuits, amplifiers, and a grid controlled rectifier before being supplied to the solenoids. Separate controls in each of these circuits enable excellent control of the motion of the core.

For further objects and advantages and for a better understanding of our invention, attention is now directed to the following description and accompanying drawing and also to the appended claims. In the drawing, Fig. 1 is a schematic electric diagram illustrating a preferred embodiment of this invention, and Fig. 2 is a simplified arrangement of a pump utilizing the circuit of Fig. 1 to produce useful reciprocating motion.

Figure 2:
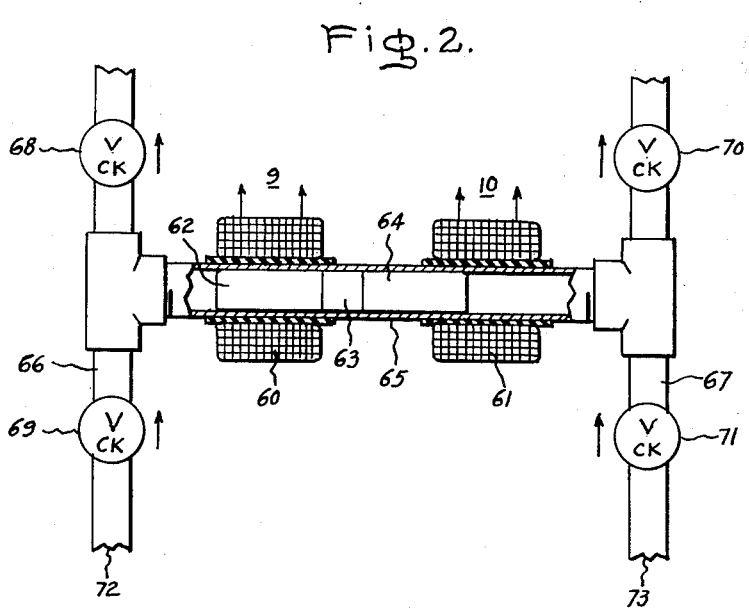

Referring to Fig. 1, a square wave generator 1 produces a pair of rectangular waves which are 180° out of phase and are coupled through electrical connectors 2 and 3 to wave shaping circuits 4 and 5, respectively. The output waves from circuits 4 and 5 are coupled by electrical connectors 6 and 7, respectively, to a grid controlled rectifier stage 8. The output current from rectifier stage 8 is supplied to terminals 9 and 10 to which the solenoids are connected to be supplied with current. A conventional full-wave rectifier and filter 11 converts a 60-cycle alternating voltage input into a direct voltage suitable for anode voltage for the various discharge devices in circuits 1, 4 and 5. Another conventional rectifier circuit and filter 12 converts a 60-cycle alternating voltage input into a negative direct voltage suitable for providing a bias voltage for a pair of discharge devices in square wave generator 1.

Referring more particularly to square wave generator 1, electron discharge devices 13, 14, 15 and 16 are connected in a ring multivibrator circuit arrangement. That is, devices 13 and 14 are connected in one delay-multivibrator circuit, and devices 15 and 16 are connected in another. Devices 14 and 16 are normally conducting, but when negative trigger voltages are supplied to the control electrodes thereof, they become nonconductive for a determinable duration of time. As is hereinafter shown, firing of one of these devices triggers the other into the nonconducting state and vice versa. In consequence thereof, each multivibrator alternately produces a pulse of voltage which is of a determinable time duration.

Devices 13, 14, 15 and 16 are each provided with separate anode resistors 17, 18, 19 and 20. A negative bias is supplied from rectifier 12 through a resistor 21 and through resistors 22 and 23 to the control electrodes of devices 13 and 15. A voltage regulator type discharge device 24 is connected from the junction of resistors 21, 22 and 23 to ground and by-passed by a capacitor 25. Device 24 maintains the bias on devices 13 and 15 constant, in spite of changes in supply voltage. This negative bias maintains devices 13 and 15 normally nonconductive such that devices 14 and 16 are normally conductive. A coupling network comprising a resistor 26 by-passed by a capacitor 27 is connected between the control electrode of device 13 and the anode of device 14. A similar network comprising a resistor 28 and a capacitor 29 is connected between the control electrode of device 15 and the anode of device 16. A time delay network which holds device 14 nonconductive for a determinable period of time following a negative trigger pulse comprises a capacitor 30, a resistor 31, and a variable resistor 32 serially connected between the anode of device 13 and rectifier 11. A resistor 33 is connected from the junction of capacitor 30 and resistor 31 to the control electrode of device 14. A similar network comprising a capacitor 34 and resistors 35, 36 and 37 provides time delay in the other delay multivibrator.

In normal operation, a negative voltage pulse is coupled from the anode of device 16 by a capacitor 38 to the control electrode of device 14. This cuts off device 14 raising the anode voltage thereof which fires device 13. The anode voltage of device 13 is lowered when it conducts, which maintains a negative voltage at the control electrode of device 14 until capacitor 30 discharges through resistors 31 and 32. Therefore, adjustment of the value of resistor 32 determines the delay time of the network and the duration of a negative pulse at the anode of device 13. When device 14 fires after capacitor 30 has discharged, the anode voltage thereof is sharply reduced. This sharp negative pulse is coupled through a capacitor 39 to the control electrode of device 16 to cut it off. Device 16 is then nonconductive until capacitor 34 discharges, at which time device 16 becomes conductive and triggers device 14. The trigger connections between devices 14 and 16 are shielded to prevent false triggering by pickup from the alternating voltage supply. The value of resistor 35 determines the time of conduction of device 15, and it can thus be seen that the duration output pulses from the individual multivibrator circuits are mutually exclusive.

Circuits 4 and 5 are alike, and for the sake of brevity only wave shaping circuit 4 will be described. The purpose of the wave shaping circuits is to alter the shape of the output wave from circuit 1 such that the beginning of the wave has a high initial peak which falls off exponentially to a shelf of constant magnitude and, at the end of the wave, falls off sharply to zero. The object in having such a wave form lies in the fact that more power is initially necessary to overcome the rest inertia of the core in the solenoid than is required to maintain its motion once this force has been overcome. Consequently, the high initial peak represents the starting power and the shelf or plateau represents that power necessary to maintain motion. As will hereinafter be described, both the initial pulse height and the shelf height are adjustable for maximum flexibility of the system, the former being adjustable in time width, and the latter being adjustable in magnitude.

A pair of diode electron discharge devices 40 and 41 have the anodes thereof directly connected to the control electrode of a discharge device 42 which is provided with a cathode resistor 43 and is known in the art as a cathode follower. A capacitor 44 is interconnected between the cathode of devices 40 and 41. The anode of device 42 is connected to the output of rectifying circuit 11 to supply anode voltage thereto, and resistors 45, 46 and 47 are interconnected between the anode of device 42 and ground. A variable tap is provided on resistor 46 and a variable resistor 48 is connected between this tap and the cathode of device 41. A resistor 49 is interconnected between the cathode and control electrode of device 42. A resistor 50 having a variable tap 51 located thereon and a resistor 52 are serially connected between the anode of device 42 and ground.

Diodes 40 and 41 are clamper devices to maintain the control electrode of device 42 at a potential less than that of the diode cathode which is at the lower value. Because the control electrode might be at any voltage less than that of the cathodes of devices 40 and 41, a resistor 49 having a substantially high value is interconnected between the control electrode and the cathode of device 42. Therefore, a positive signal applied to the cathode of device 40 causes conduction of cathode follower 42, making effective the control of either of the clamper devices. The positive excursion of the input wave from the anode of device 13 raises the voltage of the cathode of device 40 which permits the control electrode of device 42 to rise to a value above cutoff providing, of course, the cathode of device 41 is not lower than the potential to which the control electrode of device 42 rises. At the beginning of the positive portion of the square wave, the cathode of device 41 is lower than the potential to which the control electrode would ordinarily rise. A direct voltage bias is provided on the cathode of device 41 from the tap on resistor 46, and at the beginning of the positive excursion of the square wave, the wave is differentiated by capacitor 44 and resistor 48 and the voltage drop thereby produced across resistor 48 is superimposed upon the direct voltage bias. It can be shown that the cathode of device 41 rises to a voltage which is considerably more than the positive excursion of the cathode of device 40, thus providing the initial voltage peak. The duration of this initial peak is dependent upon the time required for capacitor 44 to discharge through resistor 48. Consequently, the setting of resistor 48 determines the length of time of this initial peak of the output wave. When the voltage of the cathode of device 41 falls below the voltage level of the cathode of device 40, the control electrode voltage of device 42 is decreased accordingly by the clamping action of the diode until capacitor 44 is discharged. At this time, the cathode of device 41 is at the voltage determined by the position of the tap on resistor 46. The control electrode voltage of device 42 then remains at the level determined by the setting of resistor 46 until the end of the positive excursion of the input wave from generator 1. At this time, the cathode of device 41 drops to a voltage level below that of device 40 until capacitor 44 is again charged. As a result, at the end of the positive pulse of the input square wave, a sharp spike of negative amplitude appears in the output wave from the wave shaping circuit 4 because device 42 is merely a cathode follower which has an output which very nearly follows the shape of the input. It can thus be seen that the setting of resistor 48 determines the length of time of the initial pulse while the setting of potentiometer 46 determines the voltage level of the shelf or plateau part of the wave.

Grid controlled rectifier circuit 8 is composed of two like parts, one of which supplies the output current to that solenoid connected to terminals 10 and receives its control signal from wave shaping circuit 4 and the other supplies power current to that solenoid connected to terminals 9 and is provided with a control signal from wave shaping circuit 5. Once more for the sake of brevity we shall describe only that half of circuit 8 which is supplied with the output from wave shaping circuit 4 and supplies power current to terminals 10. This portion of the circuit includes a pair of thyratron discharge devices 53 and 54 which are connected as a conventional full-wave rectifier across the secondary winding 55 of a transformer 56. The primary winding of a transformer 57 is supplied with a voltage signal from a phase shifting circuit 58 which provides the control electrodes of devices 53 and 54 with a voltage wave which lags the voltage wave on the anodes by 90 electrical degrees. As is known in the art, the time of conduction of devices 53 and 54 is, therefore, dependent upon the direct voltage level of the signal applied to the control electrodes thereof, and, consequently, this direct voltage may be used to control this time of conduction. The output voltage from wave shaping circuit 4 is, therefore, supplied from across cathode resistor 43 to a center tap on the secondary winding of transformer 57 and is thus used to regulate the direct output voltage from the rectifying stage. A unilateral impedance device 59 is interconnected between a center tap on winding 55 and the cathodes of devices 53 and 54 to maintain the cathodes of these devices negative with respect to the anodes as the devices are phased off. The solenoids are, therefore, supplied with a rectified direct voltage which varies according to the wave shape voltage from circuits 4 and 5. For most applications, although the power current is rectified alternating current, the inductance of the coils smooths out the current sufficiently to minimize undesirable cyclic force variations during the operating stroke.

Referring to Fig. 2, a pair of solenoids 60 and 61 are respectively connected to output terminals 9 and 10 of the control circuit shown in Fig. 1. A soft iron core 62 is fastened to a brass or other nonmagnetic material 63 which is in turn fastened to a ferro-magnetic iron core 64. Coils 60 and 61 are wound on a pipe 65 in which is located the core consisting of members 62, 63 and 64. Another pipe 66 is joined to one end of pipe 65 to form a T section and a similar pipe 67 is fastened to the other end of pipe 65 to form another T section. Check valves 68 and 69 are located in opposite legs of the T at one end of pipe 65, and check valves 70 and 71 are located in opposite arms of the T section at the other end of pipe 65. Ends 72 and 73 of pipes 66 and 67 are immersed in a liquid.

With the iron cores in the position shown, assume current to be supplied to solenoid 61 from terminals 10. At this time, core 64 is drawn into solenoid 61 which sucks up a quantity of liquid through valve 69. When solenoid 60 is now energized by the current from terminal 9 and solenoid 61 is deenergized, core 62 is drawn into solenoid 60 and forces some of the liquid in that portion of pipe 65 between member 62 and pipe 66 out through valve 68. A similar action occurs at the other end of pipe 65. As a result, as the core moves back and forth, the liquid is first forced out through valve 68 and then through valve 70. It should be understood that such a pump is not intended to compete with well-known motor driven types; however, this application has merely been shown for illustrative purposes to demonstrate a practical use of the reciprocator built according to this invention. Another application of this invention is to move a paddle in a liquid which is located in a vacuum. In such an application, it is, of course, difficult and impractical to use those methods of stirring well known in the art. By the use of this reciprocator, stirring is very easily accomplished without fear of losing the vacuum. Also, in the case of radio active material, it is possible to produce reciprocating motion without exposing the operator or the major portions of the device to the radio activity.

The control circuit, together with suitable solenoids, cores, etc., provides a very flexible device for directly producing reciprocating motion. It has the advantage over mechanical systems in that an operator may control the motion of the reciprocating member in both the forward and backward swings. Also, changes in this motion during operation are easily effected without shutdown of the machine. The control circuit shown finds application where the current to a single solenoid is to be controlled or where a push-pull arrangement is desired to supply current to a pair of solenoids. Because the control of the output wave from the wave shaping circuit is extremely wide, the circuit may also be used to supply power current to a rotary type solenoid where a high initial peak is generally unnecessary.

While this invention has been described by a particular embodiment thereof, it will be understood that those skilled in the art may make many changes and modifications without departing from the true spirit of this invention. Therefore, by the appended claims, it is intended to cover all such changes and modifications which fall within the true spirit and scope of this invention.

What we claim as new and desire to secure by Letters Patent of the United States is:

1. A wave shaping circuit for altering the shape of a square wave of voltage by providing a sharp spike of adjustable width at the beginning of the pulse, said wave shaping circuit comprising an electric valve provided with a control electrode and connected in a cathode follower circuit, a source of bias voltage, and means supplying a voltage signal to said control electrode superimposed on said bias voltage and having an amplitude dependent on the differential of an input voltage wave, said last-mentioned means including a pair of unilateral impedances each having an anode and a cathode and having its anode connected to said control electrode, a capacitor connected between the cathodes of said unilateral impedances and a resistor connected between the cathode of one of said impedances and said bias voltage source.

2. A wave shaping circuit for altering the shape of a square pulse of voltage by providing a sharp spike of adjustable width at the beginning of the pulse, said wave shaping circuit comprising an electric valve provided with a control electrode and connected in a cathode follower circuit, means connected to supply a bias voltage to said control electrode, and means for supplying a voltage signal to said control electrode having an amplitude dependent on the differential of an input voltage wave, said last mentioned means including a pair of valves having their anodes connected to said control electrode, capacitor means connected between the cathodes of said valves, and resistance means connected between the cathode of one of said valves and said means for supplying a bias voltage to said control electrode, said resistance means being adjustable to determine the width of said sharp spike of voltage.

3. A wave shaping circuit for altering the shape of a square pulse of voltage by providing a sharp spike of adjustable width at the beginning of the pulse, said wave shaping circuit comprising an electric valve provided with a control electrode and connected in a cathode follower circuit, means including a resistor connected to supply a bias voltage to said control electrode, and means for supplying a voltage signal to said control electrode having an amplitude dependent on the differential of an input voltage wave, said last-mentioned means including a pair of valves having their anodes connected to said control electrode, capacitor means connected between the cathodes of said valves, and resistance means connected between the cathode of one of said valves and an intermediate point on said resistor, said intermediate point on said resistor being adjustable to determine the amplitude of said square wave and said resistance means being adjustable to determine the duration of said sharp spike of voltage.

WILLIAM C. WHITE.
HAROLD W. LORD.

References Cited in the file of this patent

UNITED STATES PATENTS

| Number | Name | Date |
| --- | --- | --- |
| 2,154,627 | Knobel | Apr. 18, 1939 |
| 2,182,014 | Clark | Dec. 5, 1939 |
| 2,251,973 | Beale et al. | Aug. 12, 1941 |
| 2,400,908 | Birss | May 28, 1946 |
| 2,413,440 | Farrington | Dec. 31, 1946 |
| 2,445,014 | Wolff | July 13, 1948 |
| 2,491,029 | Brunn | Dec. 13, 1949 |
| 2,523,283 | Dickson | Sept. 26, 1950 |